(12) United States Patent
Varga et al.

(10) Patent No.: US 9,715,644 B1
(45) Date of Patent: Jul. 25, 2017

(54) PROTECTOR COAT BITMAP GENERATION FOR PRINTING SYSTEMS

(71) Applicants: John Thomas Varga, Longmont, CO (US); Alexandru Virgil Panek, Ghiroda (RO)

(72) Inventors: John Thomas Varga, Longmont, CO (US); Alexandru Virgil Panek, Ghiroda (RO)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/053,187

(22) Filed: Feb. 25, 2016

(51) Int. Cl.
| | |
|---|---|
| *B41J 2/15* | (2006.01) |
| *G06K 15/02* | (2006.01) |
| *G06K 15/10* | (2006.01) |
| *B41J 2/21* | (2006.01) |

(52) U.S. Cl.
CPC ........ *G06K 15/1832* (2013.01); *B41J 2/2132* (2013.01); *G06K 15/102* (2013.01); *G06K 15/1843* (2013.01)

(58) Field of Classification Search
CPC . B41J 2/21; B41J 2/2114; B41J 2/2146; B41J 2/2117; B41J 2/2052; G06K 15/1802; G06K 15/1822; G06K 5/181; G06K 15/1843
See application file for complete search history.

(56) References Cited

U.S. PATENT DOCUMENTS

| | | | |
|---|---|---|---|
| 4,783,834 A | 11/1988 | Anderson et al. | |
| 6,231,175 B1 * | 5/2001 | Miyakoshi | B41J 2/2114 347/101 |
| 6,474,778 B1 * | 11/2002 | Koitabashi | B41J 2/2107 347/100 |
| 7,196,714 B2 | 3/2007 | Someno | |
| 7,672,474 B2 | 3/2010 | Nakamura et al. | |
| 7,777,758 B2 | 8/2010 | Yhann et al. | |
| 8,130,413 B1 | 3/2012 | Pellore | |
| 8,208,827 B2 | 6/2012 | Sakata | |
| 8,474,936 B2 * | 7/2013 | Takekoshi | B41J 2/2114 347/100 |
| 8,615,182 B2 | 12/2013 | Ikeda | |
| 8,619,335 B2 | 12/2013 | Matsunaga | |

(Continued)

OTHER PUBLICATIONS

Printing with White and Clear Toner on the OKI C941dn, Oki, 2014, Entire Document.

*Primary Examiner* — Lamson Nguyen
(74) *Attorney, Agent, or Firm* — Duft Bornsen & Fettig LLP

(57) ABSTRACT

One embodiment comprises a system that includes a first print head that applies a colorant to a medium based on a first bitmap that indicates printable features for the medium, and a second print head that applies a clear protectant to the medium based on a second bitmap. The system receives the first bitmap, and replicates the printable features in the first bitmap to generate the second bitmap. The system identifies boundaries of the printable features in the second bitmap, and expands the boundaries of the printable features in the second bitmap where the clear protectant is applied to the medium. The system directs the first print head to apply the colorant to the medium to form the printable features based on the first bitmap, and directs the second print head to apply the clear protectant to the printable features formed on the medium based on the second bitmap.

20 Claims, 11 Drawing Sheets

(56) References Cited

U.S. PATENT DOCUMENTS

| | | |
|---|---|---|
| 8,934,144 B2 | 1/2015 | Panek et al. |
| 9,025,987 B2 | 5/2015 | Shindo |
| 2012/0269525 A1 | 10/2012 | Shindo |
| 2014/0168672 A1 | 6/2014 | Haruta |
| 2015/0110535 A1 | 4/2015 | Kogusuri et al. |

* cited by examiner

PROTECTOR COAT BITMAP GENERATION FOR PRINTING SYSTEMS

FIELD

This disclosure relates to the field of printing systems, and in particular, to printing systems that apply clear protectant overcoats.

BACKGROUND

Ink jet printing systems mark a printable medium by propelling droplets of ink onto the medium. Although a number of variations exist in the types of ink jet printing systems that are in use, the two main types of ink jet printing systems are Drop-On-Demand (DOD) printing systems and continuous ejection printing systems. DOD printing systems utilize heating elements or piezoelectric elements within ink ejection nozzles to propel ink on demand onto the medium. Continuous ejection printing systems utilize a continuous stream of ink and electrostatic fields to control the placement of the ink onto the medium.

In some cases, it may be desirable to apply a clear protectant to the ink features that have been marked to the medium. For example, the protectant may be used with water-soluble inks to prevent the ink from smearing or otherwise being affected by water. Applying the protectant is performed after the inked images are applied to the medium. For example, the protectant may be applied over the inked portions of the medium at a location in the print path that is downstream of the ink marking process.

The protectant is a consumable resource in a printing system and an expense in the printing process that is factored into the costs associated with the printing process. Typically the protectant is applied to the entire page or sheet of a job. However, applying the protectant in this manner can be wasteful, since inked features on the medium rarely encompass the entire page or sheet on the medium.

SUMMARY

Embodiments described herein provide targeted application of a clear protectant to print features marked onto a printable medium. In the embodiments described, a colorant bitmap includes printable features that will be marked to a medium. The colorant bitmap is copied to a protectant bitmap that will control the application of the clear protectant onto the medium. Boundaries of the printable features in the protectant bitmap are identified, and the boundaries where the clear protectant will be applied to the medium are expanded. This effectively enlarges the boundaries where the clear protectant will be applied to print features that are marked onto the medium. The printable features in the colorant bitmap are printed to the medium, and the clear protectant is applied to the features marked onto the medium.

One embodiment comprises a system that includes a first print head that applies a colorant to a medium based on a first bitmap that indicates printable features for the medium, and a second print head that applies a clear protectant to the medium based on a second bitmap. The system further includes a controller that receives the first bitmap, and replicates the printable features in the first bitmap to generate the second bitmap. The controller identifies boundaries of the printable features in the second bitmap, and expands the boundaries of the printable features in the second bitmap where the clear protectant is applied to the medium. The controller directs the first print head to apply the colorant to the medium to form the printable features on the medium based on the first bitmap, and directs the second print head to apply the clear protectant to the printable features formed on the medium based on the second bitmap.

Another embodiment comprises a method operable in a printing system that includes a first print head configured to apply a colorant to a medium based on a first bitmap that indicates printable features for the medium, and a second print head configured to apply a clear protectant to the medium based on a second bitmap. The method comprises receiving the first bitmap, and replicating the printable features in the first bitmap to generate the second bitmap. The method further comprises identifying boundaries of the printable features in the second bitmap, and expanding the boundaries of the printable features in the second bitmap where the clear protectant is applied to the medium. The method further comprises directing the first print head to apply the colorant to the medium to form the printable features on the medium based on the first bitmap, and directing the second print head to apply the clear protectant to the printable features formed on the medium based on the second bitmap.

Another embodiment comprises a non-transitory computer readable medium embodying programmed instructions which, when executed by a processor of a printing system that includes a first print head configured to apply a colorant to a medium based on a first bitmap that indicates printable features for the medium, and includes a second print head configured to apply a clear protectant to the medium based on a second bitmap, direct the processor to receive the first bitmap. The instructions further direct the processor to replicate the printable features in the first bitmap to generate the second bitmap, and to expand the boundaries of the printable features in the second bitmap where the clear protectant is applied to the medium. The instructions further direct the processor to direct the first print head to apply the colorant to the medium to form the printable features on the medium based on the first bitmap, and to direct the second print head to apply the clear protectant to the printable features formed on the medium based on the second bitmap.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
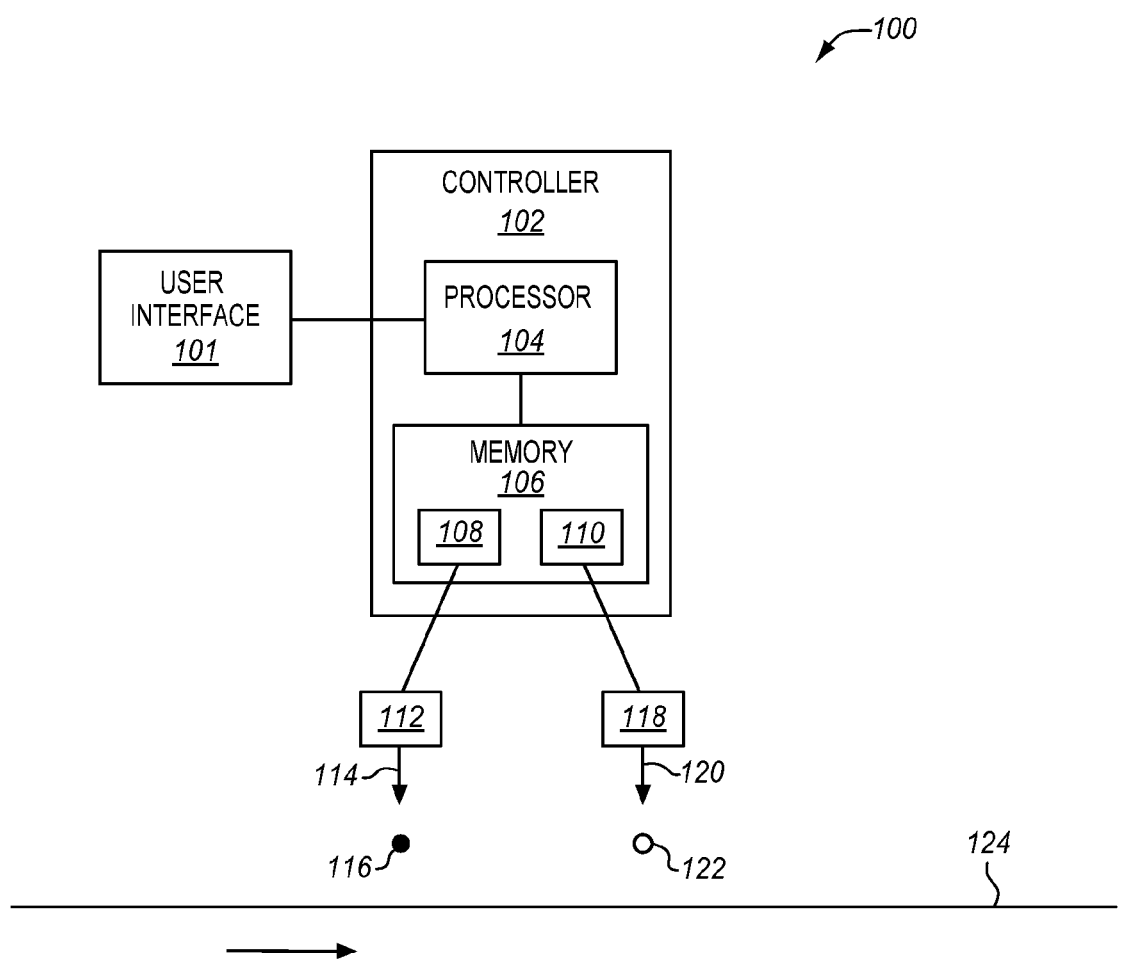
FIG. 1 is block diagram of a printing system in an exemplary embodiment.

FIG. 1 is block diagram of a printing system 100 in an exemplary embodiment. In this embodiment, printing system 100 includes a controller 102 that comprises any component, system, or device that is able to coordinate the printing activities for printing system 100. For instance, controller 102 may create, store, and modify bitmaps that are used during the printing process, such as bitmaps used to control the application of a clear protectant onto a medium. Controller 102 may also be referred to as a Digital Front End (DFE).

In this embodiment, controller 102 includes one or more processors 104 that are communicatively coupled to a memory 106. Memory 106 stores a first bitmap 108, which indicates printable features for a medium 124. Medium 124 may include any printable substrates, including paper, metal, plastic, textiles, fabric, glass, wood, etc. Some examples of printable features include text, line art, images, graphics, etc.

Bitmap 108 may be generated by processor 104 during a printing process. For instance, processor 104 may generate raster images of print data, which are used by print heads to control the application of ink onto a printable medium. Bitmap 108 may also be referred to as color plane data. For instance, bitmap 108 may comprise one or more of Cyan (C) Magenta (M), Yellow (Y), Key black (K) color plane data. Each of the C, M, Y, and K color planes are used to control the application of different colorants onto a print media. For instance, a printing system may utilize a different print head to dispense each of the C, M, Y, and K colors onto a print media, with each print head separately controlled by a different plane of color data.

In the embodiments described herein, bitmap 108 may comprise one or more of the C, M, Y, and K bitmaps used during a printing process. For instance, in a job that is not printed in color, bitmap 108 may correspond to the K plane bitmap used during a printing process. However, if a job is printed in color, bitmap 108 may correspond with any of the C, M, Y, or K bitmaps.

In this embodiment, printing system 100 includes one or more first print head(s) 112 that are able to dispense drops of one or more colorant(s) 116 utilizing one or more nozzles 114. For instance, print head(s) 112 may comprise separate heads for each of the C, M, Y, K colorants that may be marked to medium 124 by printing system 100.

Colorant 116 may comprise ink, paint, or other materials that are capable of marking medium 124. Print head 112 comprises any component, system, or device that is able to mark medium 124 with colorant 116. Colorant 116 is ejected from nozzles 114 by print head 112 based on bitmap 108, and strikes medium 124. Although only one nozzle is illustrated for print head 112, print head 112 may include any number of nozzles 114 that are each capable of dispensing drops of colorant 116 onto medium 124.

In this embodiment, memory 106 also stores a second bitmap 110, which is used by a second print head 118 to dispense a clear protectant 122 from one or more nozzles 120. Print head 118 comprises any component, system, or device that is able to mark medium 124 with protectant 122. Although only one nozzle is illustrated for print head 118, print head 118 may include any number of nozzles 120 that are each capable of dispensing drops of protectant 122 onto medium 124. Protectant 122 is used as an overlay by printing system 100, and is applied onto the printable features marked to medium 124 by print head 112. In this embodiment, medium 124 moves in the direction of the arrow illustrated in FIG. 1, although in some embodiments, print head 112 and/or print head 118 may move relative to medium 124. Protectant 122 may be used by printing system 100 to prevent the smearing of printable features that have been applied to medium 124 by print head 112. For instance, if colorant 116 is water soluble, then protectant 122 may be applied to colorant 116 to prevent water from impacting the print quality of the job.

In this embodiment, printing system 100 further includes a user interface 101. User interface 101 comprises any component, system, or device that is able to receive information from a user, and to present information to the user. Some examples of user interface 101 include a keyboard, a mouse, a display, and combinations thereof.

While the specific hardware implementation of controller 102 is subject to design choices, one particular embodiment may include one or more processors 104 communicatively coupled with memory 106. Processor 104 includes any electronic circuits and/or optical circuits that are able to perform functions. For example, processor 104 may perform any functionality described herein for controller 102. Processor 104 may include one or more Central Processing Units (CPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

Memory 106 includes any electronic circuits, and/or optical circuits, and/or magnetic circuits that are able to store data. For instance, memory 106 may be used to store bitmaps (e.g. bitmap 108 and/or bitmap 110). Memory 106 may include one or more volatile or non-volatile Dynamic Random Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

Figure 2:
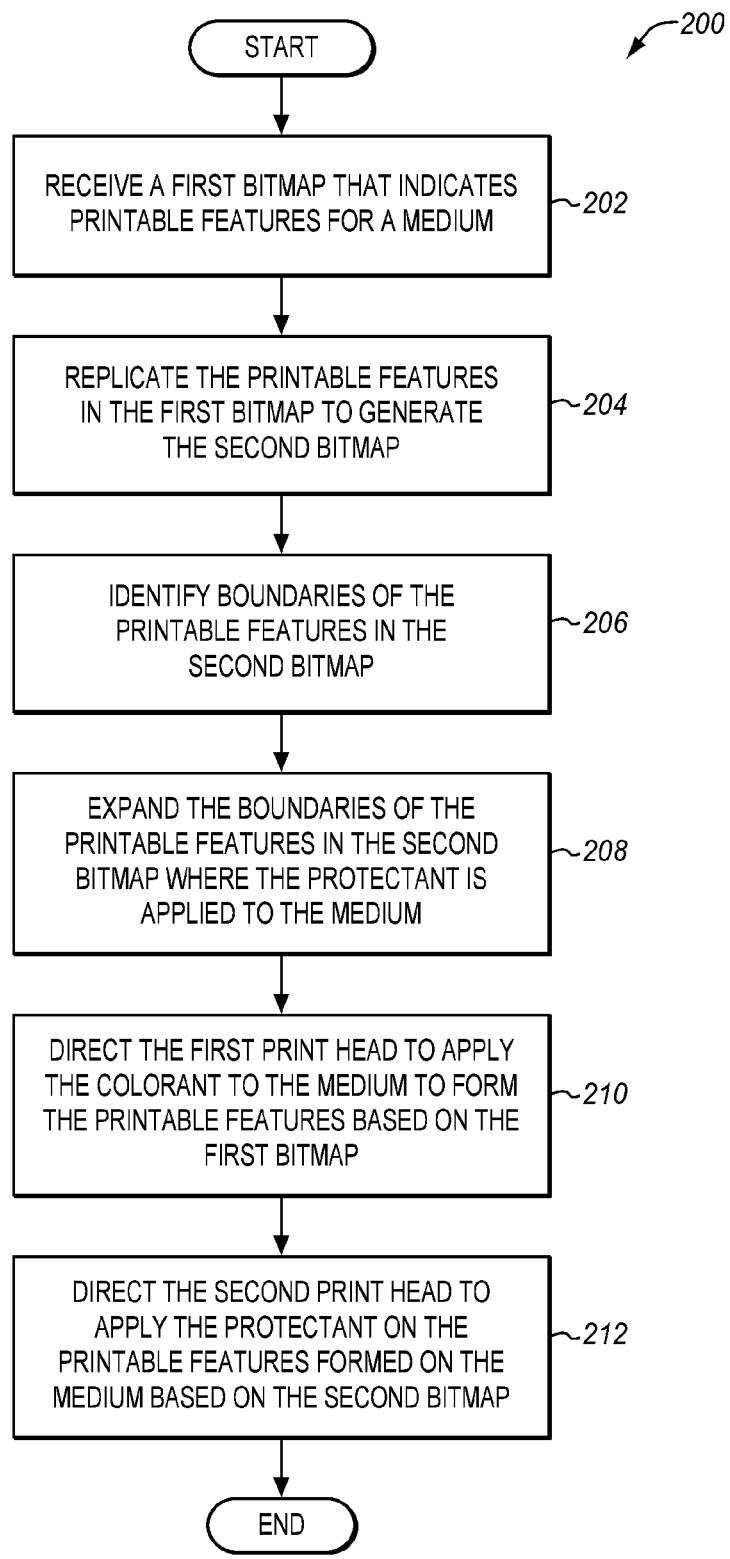
FIG. 2 is a flow chart of a method for applying a protective coating onto a printable medium in an exemplary embodiment.

When printing system 100 is operational and configured to apply a protective coating to a print media, a process may be performed to generate bitmap data that is used to apply the protective coating. FIG. 2 is a flow chart of a method 200 for applying a protective coating onto a printable medium in an exemplary embodiment. Method 200 will be discussed with respect to printing system 100 of FIG. 1, although method 200 may be performed by other systems, not shown. The steps of the flow charts described herein may include other steps that are not shown. Also, the steps of the flow charts described herein may be performed in an alternate order.

Figure 3:
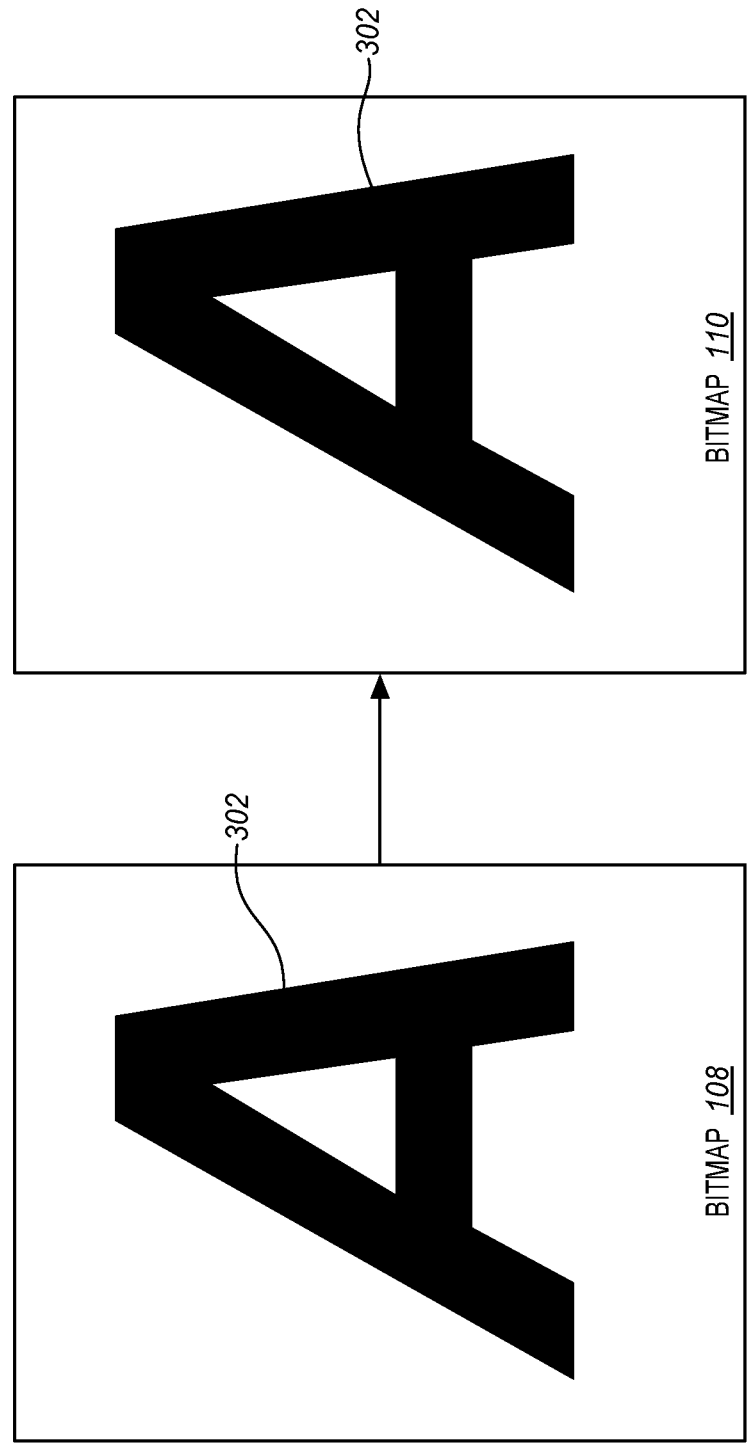
FIG. 3 illustrates a printable feature as indicated by a bitmap in an exemplary embodiment.

Processor 104 receives a bitmap 108 that indicates printable features for medium 124 (see step 202). FIG. 3 illustrates a printable feature 302 as indicated by bitmap 108 in an exemplary embodiment. As discuss previously, bitmap 108 is used by print head 112 to control the application of colorant 116 onto medium 124. For instance, bitmap 108 may comprise arrays of pel or pixel data values that are used to control the application of colorant 116 by nozzles 114. In some embodiments, the pixel values may be simple binary, with a zero or one value being used by print head 112 to turn on or off the application of colorant 116 at nozzle 114. In other embodiments, the pixel values may comprise multi-bit values, which are used by print head 112 to turn on, off, and to vary an amount of colorant 116 ejected by nozzles 114. In this embodiment, printable feature 302 comprises the text letter "A", although in other embodiments, printable feature 302 may comprise line art, graphics, pictures, etc.

Processor 104 replicates the printable features in bitmap 108 to generate bitmap 110 (see step 204 and FIG. 3). To do so, processor 104 may simply copy data from bitmap 108 into bitmap 110, or some other activity may occur. For instance, if both print head 112 and print head 118 utilize simple binary bitmaps, then it may not be necessary to translate data from bitmap 108 to bitmap 110. However, if bitmap 108 utilizes multi-bit data and print head 118 does not, then some type of bit level translation or thresholding process may be used to translate the data from bitmap 108 to bitmap 110. For instance, if bitmap 108 represents pixels as 3-bit values and bitmap 110 represents pixels as 1-bit values, then Processor 104 may perform a translation of the on/off, variable output pixel states represented in bitmap 108 to the on/off pixel states in bitmap 110. Bitmap 110 is used for applying protectant 122 to medium 124. However, bitmap 110 will first be modified to expand the coverage area of protectant 122 onto the printable features that will be marked to medium 124.

Figure 4:
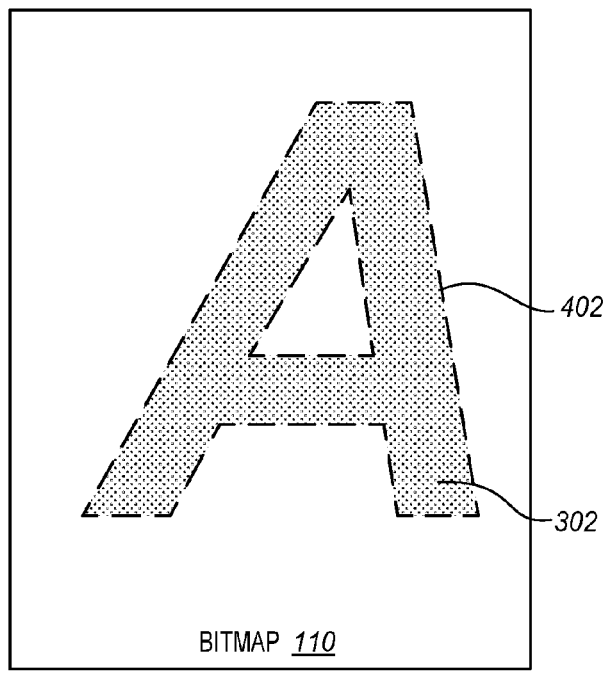
FIG. 4 illustrates a boundary around a printable feature in an exemplary embodiment.

Processor 104 processes bitmap 110 stored in memory 106 to identify the boundaries of the printable features in bitmap 110 (see step 206). FIG. 4 illustrates a boundary 402 around printable feature 302 in an exemplary embodiment. Processor 104 may identify the boundaries in a number of different ways, including identifying transitions in bitmap 110 that indicate changes in how protectant 122 is applied to colorant 116 on medium 124. For instance, if bitmap 110 is a binary bitmap, then processor 104 may process bitmap 110 to identify bit transitions from zero to one, or one to zero, which indicate where protectant 122 is applied/not applied to medium 124. If bitmap 110 is in a run ends format, then processor 104 may process run ends sequences to identify transitions. This will be discussed later.

Figure 5:
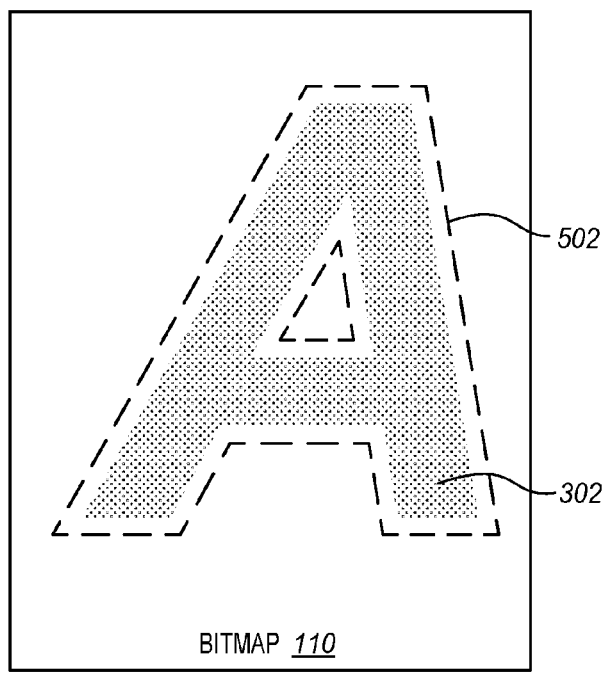
FIG. 5 illustrates an expanded boundary around a printable feature in an exemplary embodiment.

Processor 104 expands the boundaries of the printable features in bitmap 110 where protectant 122 is applied to medium 124 (see step 208). FIG. 5 illustrates an expanded boundary 502 around printable feature 302 in an exemplary embodiment. To expand boundary 402 to generate boundary 502, processor 104 may modify where the transitions occur in bitmap 110 to expand the area that protectant 122 is applied to medium 124.

Figure 6:
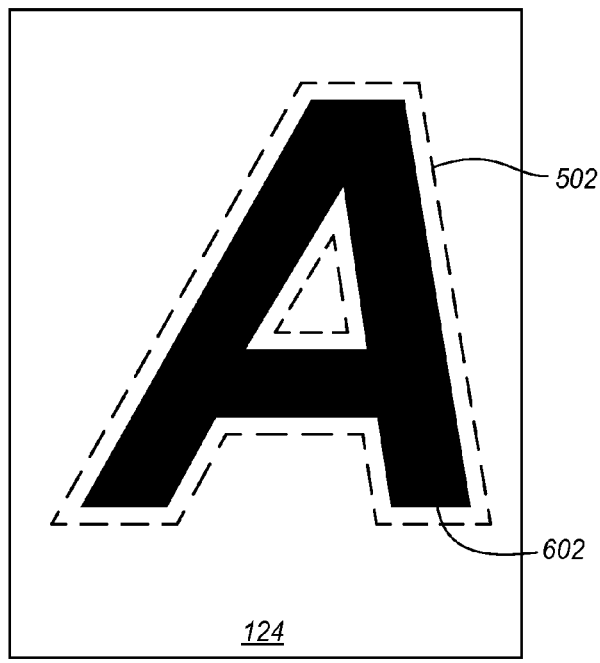
FIG. 6 illustrates a printable feature marked to a medium with colorant and protectant in an exemplary embodiment.

Processor 104 directs print head 112 to apply colorant 116 to medium 124 to form the printable features based on bitmap 108 (see step 210). Processor 104 directs print head 118 to apply protectant 122 to the printable features formed on medium 124 based on bitmap 110. FIG. 6 illustrates a printable feature 602 marked to medium 124 with colorant 116 and protectant 122 in an exemplary embodiment. Protectant 122 is applied across printable feature 602, and extends beyond the boundaries of printable feature 602 using expanded boundary 502.

Using expanded boundary 502 for the application of protectant 122 can provide a number of advantages to printing system 100. For instance, if protectant 122 were applied over the entire surface of medium 124, then more protectant 122 would be used during the printing process than is necessary. If protectant 122 were applied over printable feature 602 without expansion, then a registration mismatch between print head 112 and print head 118 may result in portions of printable feature 602 not being covered by protectant 122. The result in this case is that smearing or other print quality problems may arise. A registration mismatch may occur between print head 112 and print head 118 due to variations in the position of medium 124, as medium 124 traverses between print head 112 and print head 118.

Although only one bitmap 108 has been used to generate bitmap 110, bitmap 110 may be generated using multiple bitmaps. For instance, each of the C, M, Y, and K bitmaps may define different printable features, and these printable features may be replicated into bitmap 110 prior to the expansion process. Each C, M, Y, and K bitmap may be processed sequentially to generate bitmap 110, with each iteration replicating their respective printable features into bitmap 110. Or, a process may occur to align the pixel locations in the C, M, Y, and K color planes with each other, and either set or clear a corresponding pixel location in bitmap 110 if any of the C, M, Y, and K color planes marks that particular pixel location. In some embodiments, the expansion of printable features in bitmap 110 may be expanded by modifying sequences of run ends. This will be discussed next.

Figure 7:
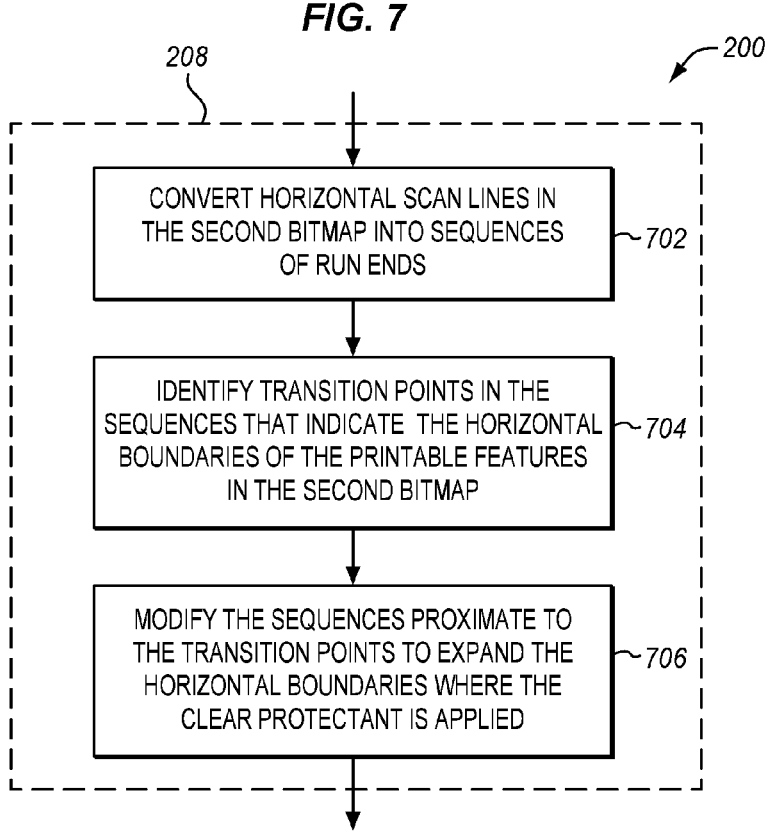
FIG. 7 is a flow chart of additional details of the method of FIG. 2 for horizontal scan line expansion in an exemplary embodiment.

FIG. 7 is a flow chart of additional details of method 200 for a horizontal expansion of bitmap 110 in an exemplary embodiment. In order to locate boundary 402 of print feature 302 in bitmap 110 along a horizontal axis, processor 104 first converts horizontal scan lines in bitmap 110 into sequences of run ends (see step 702). The run ends format is a variation of run length encoding. Run length encoding relies on the observation that images typically include adjacent pixels that share the same color. This is referred to as a run. Typically a run is described as a color and the number of following pixels that share that color. Run length encoding reduces the amount of data that is used to represent an image.

The run ends format is a specialized form of run length encoding that assumes a 1-bit image. In this case, there are two possible colors present in a 1-bit image. One color is white (no protectant applied, which corresponds to blank pixel) and the other color is black (protectant applied, which corresponds to non-blank pixel). For instance, if bitmap 110 is a 1-bit representation of how protectant 122 is applied to medium 124, then the run ends format would be an efficient way to represent whether a particular pixel location in bitmap 110 indicates whether protectant 122 is applied to medium 124. Since there are only two possible colors, the actual colors are not stored for each run. Instead, the colors are inferred from the previous run. In the run ends format, a 1-bit image is encoded as a collection of run ends sequences, one sequence for each scan line in the image.

Figure 8:
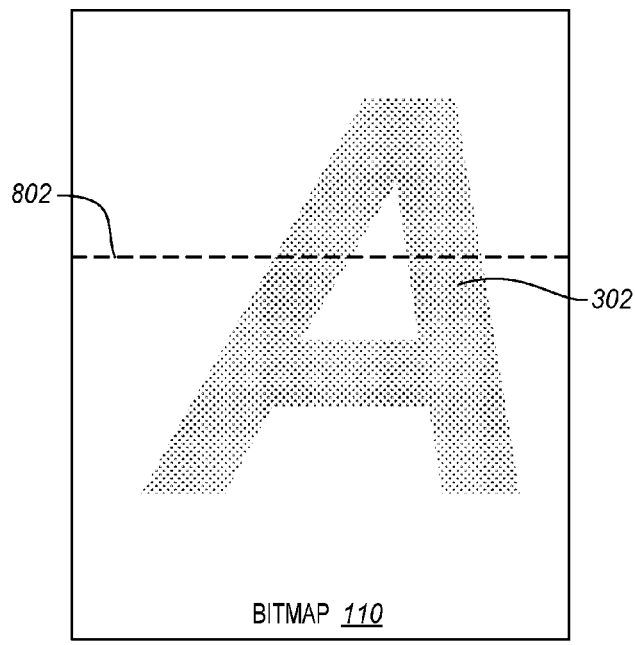
FIG. 8 illustrates a horizontal scan line that traverses across a bitmap in an exemplary embodiment.

Since most scan lines have more white runs than black runs, some variations in the run ends format assume that an image scan line starts with a white run (at run 0). Processor 104 identifies transition points in the sequences that indicate the horizontal boundaries of the printable features in bitmap 110 (see step 704). FIG. 8 illustrates a horizontal scan line 802 that traverses across bitmap 110 in an exemplary embodiment. Horizontal scan line 802 is just one scan line of a plurality of horizontal scan lines that may be processed for bitmap 110. In this embodiment, horizontal scan line 802 traverses horizontally across the letter "A", representing one possible print feature that may be indicated in bitmap 110.

Figure 9:
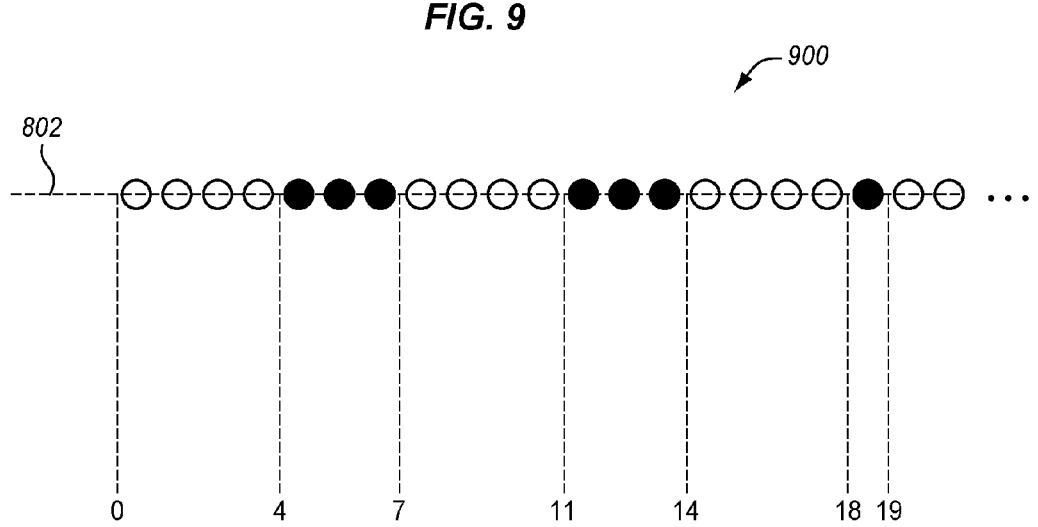
FIG. 9 illustrates a number of pixels along a horizontal scan line in an exemplary embodiment.

FIG. 9 illustrates a number of pixels 900 along horizontal scan line 802 in an exemplary embodiment. Pixels that are clear indicate that protectant 122 will not be applied to medium 124 at a particular nozzle 120 of print head 118, and pixels that are dark indicate that protectant 122 will be applied to medium 124 at a particular nozzle 120 of print head 118.

In FIG. 9, the transition points occur where pixels 900 transition between clear and dark. In the run ends format, the sequence of transitions may be [4, 7, 11, 14, 18, 19], as illustrated in FIG. 9. However, additional numbers may be present in the sequence depending on the particular implementation of the run ends format.

In this embodiment, processor 104 can directly identify the transition points in scan line 802 based on the sequence. For example, the number four in the sequence allows processor 104 to identify a run of four white pixels in scan line 802, while the number seven in the sequence allows processor 104 to identify a subsequent run of three black pixels that follow the white run of four white pixels.

Figure 10:
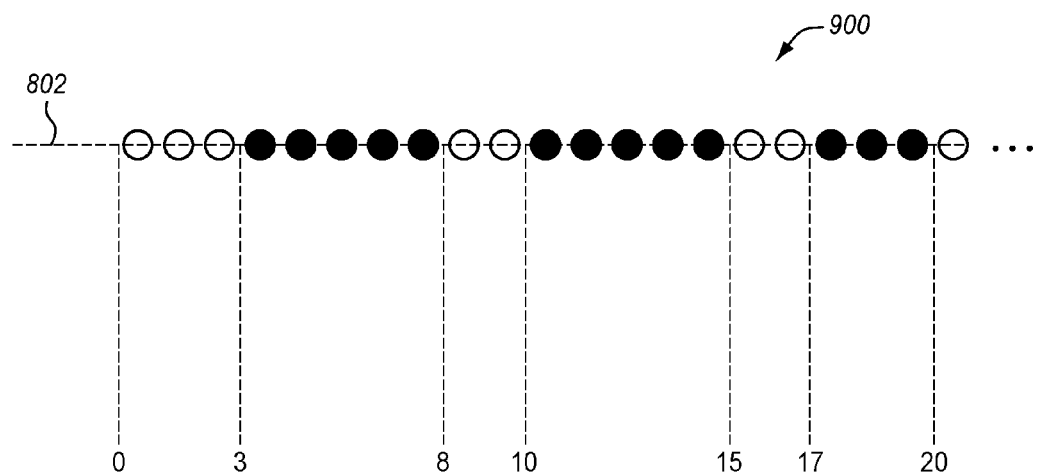
FIG. 10 illustrates how the sequence illustrated in FIG. 9 has been modified proximate to the transition points in an exemplary embodiment.

In response to identifying the transition points in the run ends sequence, processor 104 modifies the sequence proximate to the transition points to expand the horizontal boundaries where the protectant 122 is applied to medium 124 (see step 706). FIG. 10 illustrates how the sequence has been modified proximate to the transition points in an exemplary embodiment. In the run ends format, the modified sequence of transitions points is now [3, 8, 10, 15, 17, 20], corresponding to a one pixel expansion where protectant 122 will be applied to medium 124. Although FIG. 10 illustrates a 1 pixel expansion, any number may be expanded as desired to vary the amount of horizontal expansion of boundary 402.

For instance, processor 104 may be programmed to shift the transition points in the sequence by a pre-determined number of pixel locations (e.g., 10) to expand the boundaries where protectant 122 is applied to medium 124. In some embodiments, a user may utilize user interface 101 to select the pre-determined number of pixel locations for expansion. This allows the user to vary the horizontal expansion as desired. If a two pixel expansion is desired, then sequence [3, 8, 10, 15, 17, 20] becomes [2, 9, 9, 16, 16, 21]. Transition points 9, 9 and 16, 16, are then removed, resulting in a run ends sequence of [2, 21]. A three pixel expansion results in a sequence of [1, 23]. An 8 pixel expansion results in a sequence of [−4, 15, 3, 22, 10, 27]. −4 is out of bounds and is removed. 15, 3 and 22, 10 are out of order and also removed from the sequence. The resulting sequence would be [0, 27].

Figure 11:
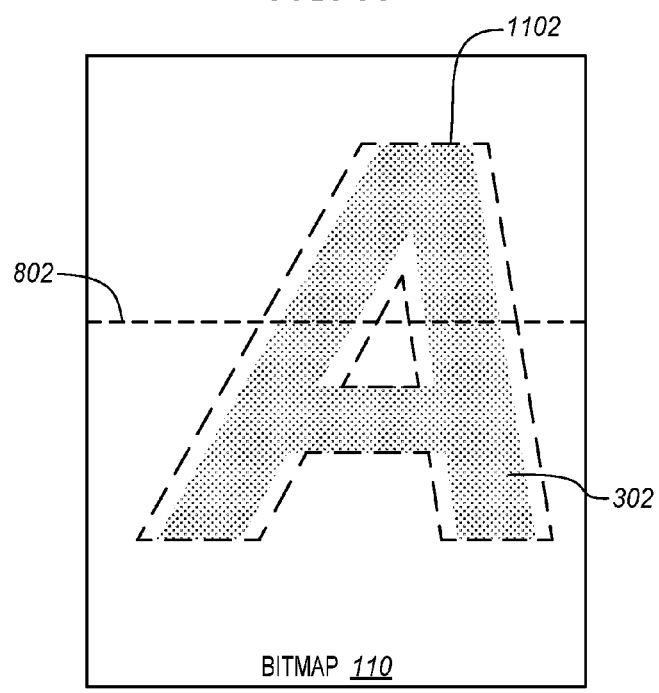
FIG. 11 illustrates a boundary for the application of a protectant after a horizontal scan line expansion in an exemplary embodiment.

This process may be repeated for any number of horizontal scan lines in bitmap 110. FIG. 11 illustrates a boundary 1102 for the application of protectant 122 after a horizontal scan line expansion in an exemplary embodiment. After the horizontal expansion process, segments of printable feature 302 that are horizontally disposed in bitmap 110 are flush with boundary 1102. These areas can be expanded as well using a number of different techniques. One technique is to rotate bitmap 110 and re-process bitmap 110 as per the steps described for FIG. 7. For instance, bitmap 110 may be rotated and another horizontal scan line expansion pass may be performed on the rotated version of bitmap 110. After the expansion, bitmap 110 is rotated back to the normal position.

Figure 12:
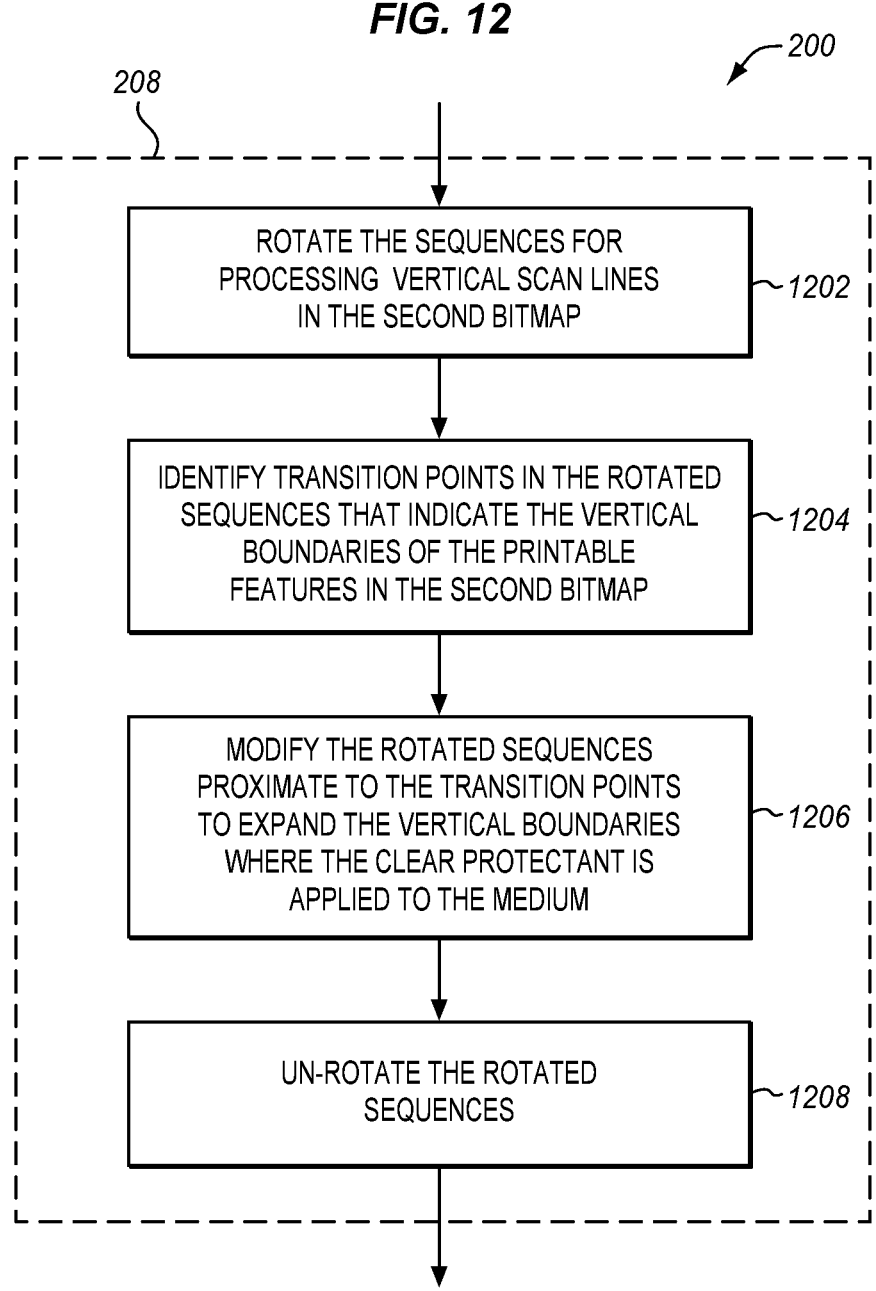
FIG. 12 is a flow chart of additional details of the method of FIG. 2 for vertical scan line expansion in an exemplary embodiment.
Figure 13:
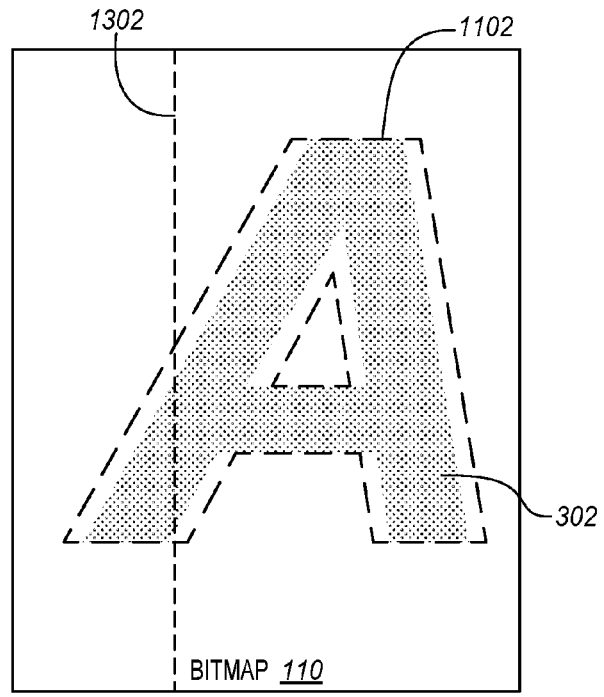
FIG. 13 illustrates a vertical scan line that traverses across a bitmap in an exemplary embodiment.

FIG. 12 is a flow chart of additional details of method 200 for a generating a vertical expansion of the printable features in bitmap 110 in an exemplary embodiment. FIG. 13 illustrates a vertical scan line 1302 that traverses across bitmap 110 in an exemplary embodiment. Vertical scan line 1302 is just one scan line of a plurality of vertical scan lines that may be processed for bitmap 110. In this embodiment, vertical scan line 1302 traverses vertically across the letter "A", representing one possible print feature that may be indicated in bitmap 110. In order to locate boundary 402 of print feature 302 in bitmap 110 along a vertical axis, processor 104 rotates the sequences of run ends (see step 1202). Those familiar with the run end compression formats will recognize that there are various processes not described herein that can efficiently rotate run end sequences within various run end formats without incurring a performance penalty of decompressing the run end sequences into bitmaps prior to rotation. For instance, a transpose operation may be performed on the run ends sequences to rotate the sequences.

Figure 14:
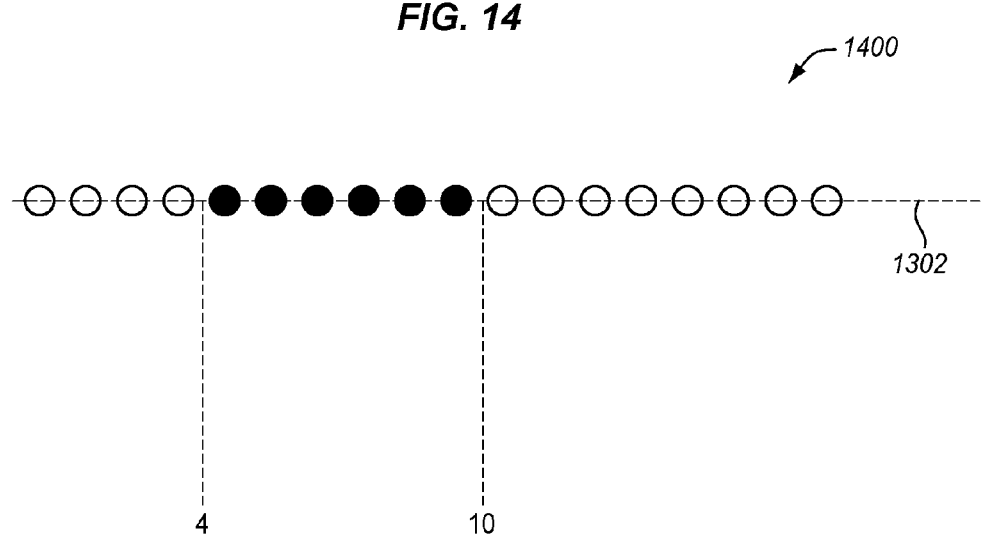
FIG. 14 illustrates a number of pixels along a vertical scan line in an exemplary embodiment.

FIG. 14 illustrates a number of pixels 1400 along vertical scan line 1302 in an exemplary embodiment. Pixels that are clear indicate that protectant 122 will not be applied to medium 124 at a particular nozzle 120 of print head 118, and pixels that are dark indicate that protectant 122 will be applied to medium 124 at a particular nozzle 120 of print head 118.

In FIG. 14, the transition points occur where pixels 1400 transition between clear and dark. In the run ends format, the sequence of transitions may be [4, 10] as illustrated in FIG. 14. However, additional numbers may be present in the sequence depending on the particular implementation of the run ends format.

In this embodiment, processor 104 can directly identify the transition points in scan line 1302 based on the sequence that indicates the vertical boundaries of the printable features in bitmap 110 (see step 1204). For example, the number four in the sequence allows processor 104 to identify a run of four white pixels in scan line 1302, while the number ten in the sequence allows processor 104 to identify a subsequent run of six black pixels that follow the white run of four pixels.

Figure 15:
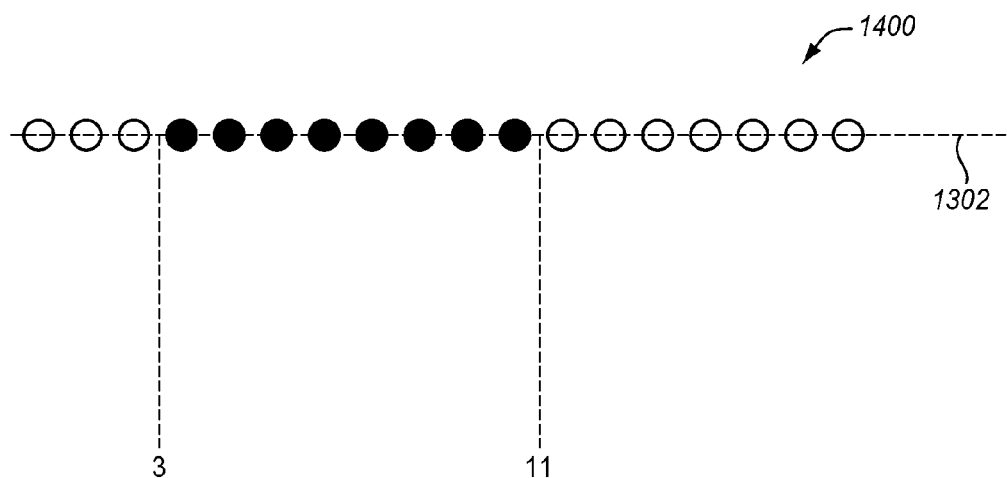
FIG. 15 illustrates how the sequence illustrated in FIG. 14 has been modified proximate to the transition points in an exemplary embodiment.

In response to identifying the transition points in the run ends sequence, processor 104 modifies the sequence proximate to the transition points to expand the vertical boundaries where the protectant 122 is to medium 124 (see step 1206). FIG. 15 illustrates how the sequence has been modified proximate to the transition points in an exemplary embodiment. In the run ends format, the modified sequence of transitions points is now [3, 11], corresponding to a one pixel expansion where protectant 122 will be applied to medium 124. Although FIG. 15 illustrates a 1 pixel expansion, any number may be expanded as desired to vary the amount of vertical expansion of boundary 1102. For instance, processor 104 may be programmed to shift the transition points in the sequence by a pre-determined number of pixel locations (e.g., 10) to expand the boundaries where protectant 122 is applied to medium 124. In some embodiments, a user may utilize user interface 101 to select the pre-determined number of pixel locations for expansion. This allows the user to vary the vertical expansion as desired. If a two pixel expansion is desired, the sequence [3, 10] becomes [2, 12]. A three pixel expansion becomes [1, 13].

This process may be repeated for a number of vertical scan lines in bitmap 110. In response to modifying the rotated sequences for vertical expansion, processor 104 un-rotates the rotated sequences (see step 1208).

Figure 16:
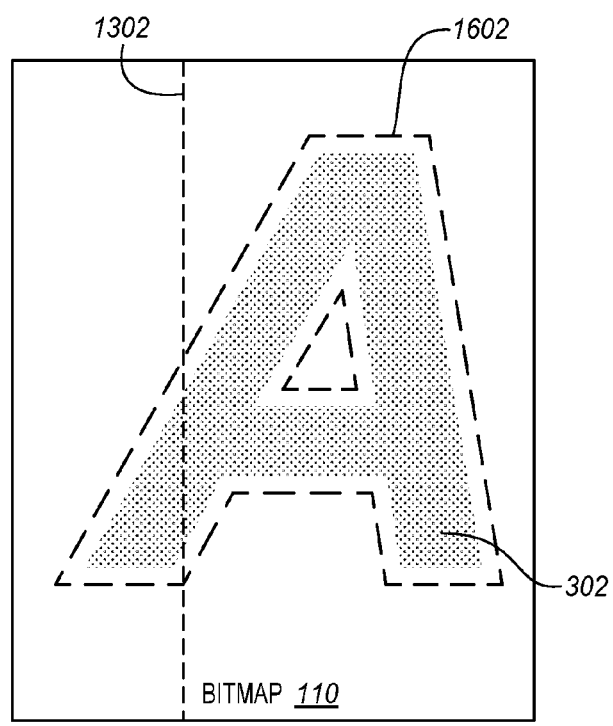
FIG. 16 illustrates a boundary for the application of a protectant after both the horizontal scan line expansion and vertical scan line expansion in an exemplary embodiment.

FIG. 16 illustrates a boundary 1602 for the application of protectant 122 after both the horizontal scan line expansion and vertical scan line expansion in an exemplary embodiment. Note that segments of printable feature 302 that are horizontally disposed in bitmap 110 are no longer flush with boundary 1102 after the vertical expansion. After the vertical expansion is performed, the previously rotated run end sequences are un-rotated prior to directing print head 118 to apply protectant 122 to the printable features formed on medium 124. For instance, another transpose operation may be performed on the rotated run ends sequences to un-rotate the sequences.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 17:
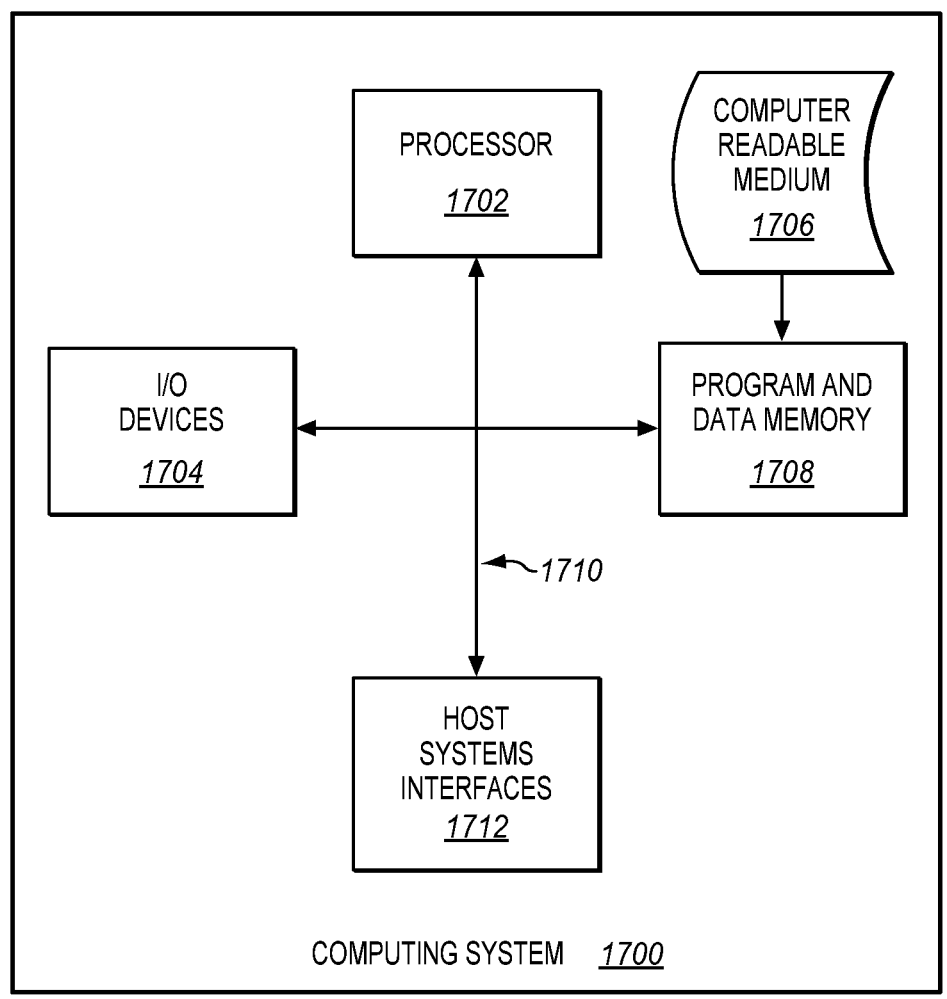
FIG. 17 illustrates a computing system in which a computer readable medium may provide instructions for performing any of the functionality disclosed herein for a controller of the printing system of FIG. 1.

In one embodiment, the invention is implemented in software, which includes but is not limited to firmware, resident software, microcode, etc. FIG. 17 illustrates a computing system 1700 in which a computer readable medium 1706 may provide instructions for performing any of the functionality disclosed herein for controller 102.

Furthermore, the invention can take the form of a computer program product accessible from computer readable medium 1706 that provides program code for use by or in connection with a processor or any instruction execution system. For the purposes of this description, computer readable medium 1706 can be any apparatus that can tangibly store the program for use by or in connection with the instruction execution system, apparatus, or device, including computer system 1700.

Computer readable medium 1706 can be any tangible electronic, magnetic, optical, electromagnetic, infrared, or semiconductor system (or apparatus or device). Examples of computer readable medium 1706 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

Computing system 1700, suitable for storing and/or executing program code, can include one or more processors 1702 coupled directly or indirectly to memory 1708 through a system bus 1710. Memory 1708 can include local memory employed during actual execution of the program code, bulk storage, and cache memories which provide temporary storage of at least some program code in order to reduce the number of times code is retrieved from bulk storage during execution. Input/output or I/O devices 1704 (including but not limited to keyboards, displays, pointing devices, etc.) can be coupled to the system either directly or through intervening I/O controllers. Network adapters may also be coupled to the system to enable computing system 1700 to become coupled to other data processing systems, such as through host systems interfaces 1712, or remote printers or storage devices through intervening private or public networks. Modems, cable modem and Ethernet cards are just a few of the currently available types of network adapters.

Although specific embodiments were described herein, the scope is not limited to those specific embodiments. Rather, the scope is defined by the following claims and any equivalents thereof.

The invention claimed is:

1. A system comprising:
a first print head configured to apply a colorant to a medium based on a first bitmap that indicates printable features for the medium;
a second print head configured to apply a clear protectant to the medium based on a second bitmap; and
a controller configured to receive the first bitmap, to replicate the printable features in the first bitmap to generate the second bitmap, to identify boundaries of the printable features in the second bitmap, to expand the boundaries of the printable features in the second bitmap where the clear protectant is applied to the medium, to direct the first print head to apply the colorant to the medium to form the printable features on the medium based on the first bitmap, and to direct the second print head to apply the clear protectant to the printable features formed on the medium based on the second bitmap.

2. The system of claim 1 wherein:
the controller is configured to convert horizontal scan lines in the second bitmap into sequences of run ends, to identify transition points in the sequences that indicate horizontal boundaries of the printable features in the second bitmap, and to modify the sequences proximate to the transition points to expand the horizontal boundaries where the clear protectant is applied to the medium.

3. The system of claim 2 wherein:
the controller is configured to rotate the sequences for processing vertical scan lines in the second bitmap, to identify transition points in the rotated sequences that indicate vertical boundaries of the printable features in the second bitmap, and to modify the rotated sequences proximate to the transition points to expand the vertical boundaries where the clear protectant is applied to the medium.

4. The system of claim 3 wherein:
the controller is configured to un-rotate the rotated sequences prior to directing the second print head to apply the clear protectant to the printable features formed on the medium.

5. The system of claim 1 wherein:
the second bitmap comprises sequences of run ends; and
the controller is configured to identify the boundaries of the printable features in the second bitmap based on transition points in the sequences.

6. The system of claim 5 wherein:
the controller is configured to shift the transition points in the sequences by a pre-determined number of pixel locations to expand the boundaries where the clear protectant is applied to the medium.

7. The system of claim 6 further comprising:
a user interface; and
wherein the controller is configured to receive input at the user interface from a user that modifies the pre-determined number of pixel locations.

8. A method operable in a printing system that includes a first print head configured to apply a colorant to a medium based on a first bitmap that indicates printable features for the medium, and a second print head configured to apply a clear protectant the medium based on a second bitmap, the method comprising:
receiving the first bitmap;
replicating the printable features in the first bitmap to generate the second bitmap;
identifying boundaries of the printable features in the second bitmap;
expanding the boundaries of the printable features in the second bitmap where the clear protectant is applied to the medium;
directing the first print head to apply the colorant to the medium to form the printable features on the medium based on the first bitmap; and
directing the second print head to apply the clear protectant to the printable features formed on the medium based on the second bitmap.

9. The method of claim 8 wherein expanding the boundaries further comprises:
converting horizontal scan lines in the second bitmap into sequences of run ends;
identifying transition points in the sequences that indicate horizontal boundaries of the printable features in the second bitmap; and
modifying the sequences proximate to the transition points to expand the horizontal boundaries where the clear protectant is applied to the medium.

10. The method of claim 9 further comprising:
rotating the sequences for processing vertical scan lines in the second bitmap;
identifying transition points in the rotated sequences that indicate vertical boundaries of the printable features in the second bitmap; and
modifying the rotated sequences proximate to the transition points to expand the vertical boundaries where the clear protectant is applied to the medium.

11. The method of claim 10 further comprising:
un-rotating the rotated sequences prior to directing the second print head to apply the clear protectant to the printable features formed on the medium.

12. The method of claim 8 wherein:
the second bitmap comprises sequences of run ends; and
the method further comprises identifying the boundaries of the printable features in the second bitmap based on transition points in the sequences.

13. The method of claim 12 further comprising:
shifting the transition points in the sequences by a pre-determined number of pixel locations to expand the boundaries where the clear protectant is applied to the medium.

14. A non-transitory computer readable medium embodying programmed instructions which, when executed by a processor of a printing system that includes a first print head configured to apply a colorant to a medium based on a first bitmap that indicates printable features for the medium, and a second print head configured to apply a clear protectant to the medium based on a second bitmap, direct the processor to:
receive the first bitmap;
replicate the printable features in the first bitmap to generate the second bitmap;
identify boundaries of the printable features in the second bitmap;
expand the boundaries of the printable features in the second bitmap where the clear protectant is applied to the medium;
direct the first print head to apply the colorant to the medium to form the printable features on the medium based on the first bitmap; and
direct the second print head to apply the clear protectant to the printable features formed on the medium based on the second bitmap.

15. The non-transitory computer readable medium of claim 14, wherein the instructions further direct the processor to:
convert horizontal scan lines in the second bitmap into sequences of run ends;
identify transition points in the sequences that indicate horizontal boundaries of the printable features in the second bitmap; and
modify the sequences proximate to the transition points to expand the horizontal boundaries where the clear protectant is applied to the medium.

16. The non-transitory computer readable medium of claim 15, wherein the instructions further direct the processor to:
rotate the sequences for processing vertical scan lines in the second bitmap;

identify transition points in the rotated sequences that indicate vertical boundaries of the printable features in the second bitmap; and modify the rotated sequences proximate to the transition points to expand the vertical boundaries where the clear protectant is applied to the medium.

17. The non-transitory computer readable medium of claim 16, wherein the instructions further direct the processor to:

un-rotate the rotated sequences prior to directing the second print head to apply the clear protectant to the printable features formed on the medium.

18. The non-transitory computer readable medium of claim 14, wherein:

the second bitmap comprises sequences of run ends; and the instructions further direct the processor to identify the boundaries of the printable features in the second bitmap based on transition points in the sequences.

19. The non-transitory computer readable medium of claim 18, wherein the instructions further direct the processor to:

shift the transition points in the sequences by a pre-determined number of pixel locations to expand the boundaries where the clear protectant is applied to the medium.

20. The non-transitory computer readable medium of claim 19, wherein the instructions further direct the processor to:

receive input at a user interface from a user that modifies the pre-determined number of pixel locations.

* * * * *